3,299,013
DYE INTERMEDIATES
Jacob Q. Umberger, Holmdel, N.J., assignor to E. I. du Pont de Nemours and Company, Wilmington, Del., a corporation of Delaware
No Drawing. Continuation of application Ser. No. 113,101, May 29, 1961. This application Dec. 17, 1964, Ser. No. 419,227
7 Claims. (Cl. 260—78.5)

This application is a continuation of my application, Serial No. 113,101, filed May 29, 1961, now abandoned.

This invention relates to color photography. More particularly it relates to novel monomeric and copolymeric dye intermediates useful in color photographic emulsions and elements. Still more particularly it relates to polymers having recurring color-forming units and non-color-forming units.

Various polymeric color formers are known in which the color-forming groups are attached to preformed maleic anhydride copolymers through an amide linkage. Since the polymeric structure of these color formers has been established, however, the physical properties of the polymers cannot be varied readily.

An object of this invention is to provide a new class of dye intermediates. Another object is to provide novel, addition copolymeric color-forming compounds which resist diffusion in thin water-permeable colloid layers of multilayer photographic elements. A further object is to provide such color-forming compounds which improve the flexibility of photographic elements. A still further object is to provide color-forming compounds which have low equivalent weight and can be utilized in thin layers. Yet another object is to provide such color-forming compounds having a wide range of hydrophilic to hydrophobic properties. Still further objects will be apparent from the following detailed description of the invention.

The novel color formers of this invention comprise an addition copolymer containing recurring units of a maleic acid derivative and the novel vinyl ether color formers herein disclosed and more particularly those of the formulas:

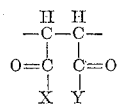

and

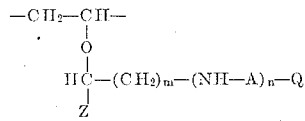

wherein the bonds are linked to each other to form a linear chain and wherein X is a member selected from the group consisting of —OR, —NH$_2$, —NHR, —NR$_2$ and —NRR' where R is alkyl of 1 to 8 carbon atoms and R' is selected from the group consisting of hydrogen and alkyl of 1 to 8 carbon atoms; Y represents the radical —OM where M is selected from the group consisting of alkali metals, e.g., Na, K, etc., ammonium and substituted ammonium, e.g., tetramethyl and tetraethyl ammonium, triethylamine and triethanolamine; and X and Y taken together form a single divalent oxygen atom or imide group, Z is a member selected from the group consisting of hydrogen and methyl, A is selected from the group consisting of

Q is a color-forming nucleus having as the active color-former a member selected from the group consisting of indazolones, anthranilones, naphthols and active methylene containing compounds, $m$ equals 0 or 1, $n$ equals 0 or 1 when $n$ equals 1 then $m$ must be 1.

Compounds containing the active color-forming group include naphtholic compounds with hydrogen or replaceable groups, e.g., halogen, carboxyl and sulfonic acid groups para to the hydroxyl; active methylene compounds such as acylacetarylides, arolacetarylides, cyanocetyl compounds, pyrazolones and other heterocyclic active methylene-containing compounds; indazolones and anthranilones. These are the preferred color formers and yield upon oxidative color-coupling or color-forming development with a primary aromatic amino developing agent, e.g., those selected from the group consisting of p-phenylenediamines and p-aminophenols, quinoneimine, azomethine and azo dyes. The color formers are of the subtractive type, i.e., cyan, magenta and yellow. The dye images formed have excellent color, stability and definition.

In a preferred embodiment of this invention, a color-forming vinyl ether monomer of the formula

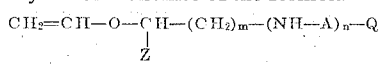

Q, Z, A, $m$ and $n$ being as described above, is prepared by condensing an ω-amino-alkyl vinyl ether and a compound having a naphthol, indazolone, anthranilone or a compound having an active methylene group as the color-former. The resultant color-forming vinyl monomer is then copolymerized with a maleic acid derivative of the type described above, e.g., maleic anhydride, half ester, amide or half amide, forming a copolymer having alternating groups of the maleic acid derivative and the vinyl ether.

The copolymeric color-forming compounds have an equivalent weight of 200 to 2000. "Equivalent weight" is defined in this invention as the number of grams of dry color-forming polymer containing 1 gram molecular weight of the active color-forming monomer, nucleus or coupling group, e.g., reactive methylene. Due in part to their low equivalent weight, multilayer color photographic elements having thin emulsion layers can be prepared. A method for determining the equivalent weight from ultraviolet spectral analysis of copolymeric color-former-containing solutions is as follows:

(1) Weight out a 0.4 to 0.6 g. sample on an analytical balance and record weight to the nearest 0.0001 g.

(2) Quantitatively rinse into a one-liter volumetric flask with alcohol.

(3) Add 40 ml. of 5% sodium hydroxide and heat with occasional shaking until the solid dissolves.

(4) Cool to 20° C. and dilute to one liter with distilled water at 20° C.

(5) Add a 10 ml. aliquot into a 200 ml. volumetric flask and dilute with 0.1 N sodium hydroxide at 20° C.

(6) Immediately obtain the optical density of the solution vs. distilled water at the absorption peak near 353 mμ for cyan, 330 mμ for yellow and 260 mμ for magenta. Use a one cm. silica cell and a standard spectrophotometer.

(7) Calculate the equivalent weight from the following formula:

$$\text{Eq. wt.} = \frac{\text{Wt. of sample in grams} \times \epsilon}{D_{max} \times 20}$$

where $\epsilon$ is the molar extinction coefficient of the color-forming nucleus or vinyl ether monomer. The coefficient $\epsilon$ is defined in Glasstone, Textbook of Physical Chemistry, 2nd edition, D. Van Nostrand Co., New York, 1946, 581.

The copolymeric color formers of this invention can be prepared having a wide range of hydrophilic to hydrophobic properties merely by proper utilization of the maleic acid derivative. By way of illustration, copolymerization of the vinyl ether with maleic anhydride leads to an extremely hydrophilic copolymeric compound which is very compatible with the standard hydrophilic colloid silver halide binding agents, e.g., gelatin. Although the maleic anhydride copolymer has good resistance to migration in photographic elements, the more hydrophobic copolymers, in general, offer greater resistance to migration. The latter type of copolymers are prepared by copolymerizing the color-forming vinyl monomer with part or all of the maleic anhydride replaced by at least one derivative of maleic acid which is more hydrophobic, e.g., a maleic half ester or half amide. Alternatively, the copolymer can be prepared with maleic anhydride and made more hydrophobic by subsequently reacting it with at least one amine, e.g., butylamine, hexylamine, octylamine, diethylamine, di-N-butylamine, N-ethylhexylamine, etc., or alcohol, e.g., n-butanol, n-hexanol, n-octanol, isopropanol, 2-ethyl hexanol, etc.

In the preparation of multilayer color photographic film elements, the copolymeric color-forming compounds of this invention are admixed with an aqueous solution of a water-permeable colloid of high molecular weight having protective colloid properties. The colloid, which can be of the natural or synthetic type, acts as a binding agent for silver halide grains present in the photographic emulsion. Gelatin traditionally has been the preferred colloidal material used in photographic emulsions. Other hydrophilic colloids which may be used in place of all or part of the gelatin in the manufacture of photographic elements include agar-agar, polyglycuronic acids, zein, collodion, water-soluble cellulose derivatives, such as substantially hydrolyzed cellulose acetate, cellulose esters of hydroxy monocarbocyclic acids, e.g., lactic or glycolic acids, alkali metal salts of cellulose esters of dicarbocyclic acids, such as phthalic acid, polyvinyl alcohol, partially hydrolyzed polyvinyl acetate and interpolymers thereof with unsaturated materials such as styrene, maleic acid, etc., water-soluble polyvinyl acetals and other hydrophilic synthetic or natural resins and polymeric compounds. Suitable hydrophilic colloids of the above types are described in U.S. Patents 2,110,491, 2,211,323, 2,276,322, 2,276,323 and 2,286,215. More recently used materials are described in assignee's following U.S. Patents: 2,397,866, 2,534,326, 2,534,707, 2,538,257, 2,752,246, 2,777,872, 2,828,204, 2,828,205, 2,829,053, 2,830,972, 2,833,650, 2,834,758 and 2,846,417.

At least one copolymeric color former containing emulsion is coated on a suitable support composed of a hydrophobic cellulose derivative, e.g., cellulose acetate, cellulose triacetate, cellulose propionate, cellulose butyrate, cellulose-acetate-butyrate, etc., or a superpolymer such as nylon, polyvinyl chloride, polyester, e.g., polyethylene terephthalate, polycarbonate. The support may be provided with a subbing layer, as is known in the art, to improve anchorage between the support and the first emulsion layer.

Inert ingredients, e.g., pigments, colloidal silver, polymer latices, matting agents, etc., may be present in all of the element layers including the support. The element may also contain chemical sensitizers, optical sensitizers, coating aids, antifoggants, nonhalation dyes or pigments and/or non-migratory brightening agents as known to the art, etc.

The invention will be further illustrated by but is not limited to the following procedures and examples.

*Procedure A.—1-hydroxy-N-(β-vinyloxyethyl) 2-naphthamide*

A solution of 132 g. (0.50 mole) of phenyl-1-hydroxy-2-naphthoate and 43.5 g. (0.50 mole) of 2-aminoethyl vinyl ether in 660 ml. of absolute alcohol was refluxed four hours, then cooled to 0° C. in an ice-salt bath, the contents of the flask setting up almost solid with crystals. The crystals were filtered, washed with alcohol, and air dried, leaving 59 g. (46% of theoretical yield) of cream-colored, cottony needles, M.P. 118.5–119.5°. The material was crystallized from 300 ml. of methanol, then from benzene, to a constant melting point of 120.5–121.0°.

*Analysis.*—Calcd. for $C_{15}H_{15}NO_3$: C, 70.02; H, 5.88; N, 5.95. Found: C, 69.78; H, 5.81; N, 5.51.

*Procedure B.—p-(α-benzolyacetamido)-N-(β-vinyl-oxyethyl)benzenesulfonamide*

To a solution of 72 g. of sodium carbonate monohydrate and 48 g. of 2-aminoethyl vinyl ether in 845 ml. of water at 10° C., there was added a hot (60° C.) solution of 169 g. of p-(α-benzoylacetamido)benzenesulfonylchloride in 845 ml. of acetonitrile. The resulting mixture was stirred 90 minutes, then poured onto a mixture of 2000 g. of ice and 500 ml. of water. After the ice had melted, the crude product was collected by filtration and dried. It was purified by recrystallizing from methanol with the aid of decolorizing carbon and dried to give 142 g. of a creamy-white powder, melting point 116–117°.

*Analysis.*—Calcd. for $C_{19}H_{20}N_2O_5S$: C, 58.74%; H, 5.19%; N, 7.21%; S, 8.20%. Found: C, 58.57%; H, 5.28%; N, 7.36%; S, 8.26%.

*Procedure C.—1-(p-chlorosulfonylphenyl)-3-methyl-5-benoxypyrazole*

To protect the active methylene group of the pyrazolone ring, sulfophenylmethyl pyrazolone was treated with benzoyl chloride in aqueous potassium carbonate solution.

Into a five-liter ring-necked flask equipped with a motor driven anchor stirrer were charged, in order, 1000 cc. of water, 254 g. (1 mole) of 1-(4-sulfophenyl)-3-methyl-5-pyrazolone, 60 g. (1 mole) of potassium hydroxide and 138 g. (1 mole) of anhydrous potassium carbonate. Ice (about 800 g.) was then added to cool the solution to 5° C., and benzoyl chloride (155 g., 1.1 moles) was run in from a dropping funnel during the course of an hour, with ice added when necessary to keep the temperature below 10° C. Stirring was then continued for 14 hours as the temperature rose to 25° C. The thick creamy mass was treated with 50 g. of potassium chloride, stirred for 30 minutes and filtered. The collected crystals were washed with a 3% potassium chloride solution and recrystallized from water (400 cc.). During the recrystallization the mixture was acidified with acetic acid (1.0 cc.) and the maximum temperature reached was 60° C. The water-washed crystals were finally rinsed with acetone and, after drying at room temperature, were placed in the vacuum oven at 70° C. for 24 hours. A 69.5% yield of 1-(p-potassium sulfophenyl)-3-methyl-5-benzoxypyrazole was obtained. A sample analyzed after drying for 48 hours at 25° C. in the vacuum desiccator afforded the following values:

*Analysis.*—Calcd. for $C_{17}H_{13}N_2O_5SK \cdot H_2O$: S, 7.7; C, 49.2; H, 3.6. Found: S, 7.25; C, 48.9; H, 4.1.

The benzoxypyrazole was treated with phosphorus pentachloride in phosphorus oxychloride solvent at low temperature to produce the corresponding sulfonyl chloride, the low temperature being required to avoid cleavage of the benzoate. Into a 1-liter three-necked flask immersed in an ice bath and equipped with a mercury-sealed stirrer, thermometer, and a glass plug were charged 220 g. (1.05 moles) of phosphorus pentachloride and 250 cc. of phosphorus oxychloride. After the mixture had been cooled to 0° C., the benzoxypyrazole prepared above (396 g., 1.0 mole) was added with stirring at such a rate that the temperature did not rise above 10° C. (about 4–5 minutes). The cooling bath was removed after 2 hours and the stirring continued as the temperature rose to 20–25° C. (3 hours). The fluid white mixture obtained was then decomposed by carefully pouring onto 3000 g. of cracked ice with good stirring, the flask being rinsed out with 20 cc. of methylene chloride. After stirring about 1 hour, the separated oil solidified to form the white crystalline sulfonyl chloride which was washed with water by decantation, filtered and pressed on a clay plate to dry. The product was dissolved in 1500 cc. of methylene chloride, separated from the water, and the solution dried over magnesium sulfate. The filtered solution was concentrated on the steam bath to about 500 cc. and then set aside in a cold room to crystallize. There was obtained 260 g. of product melting at 149–150° C., and on concentration of the mother liquors, there was obtained an additional 38 g. melting at 144–148° C. (total yield 79%). On recrystallization from dry methylene chloride the melting point was raised to 151–152° C.

*Analysis.*—Calcd. for $C_{17}H_{13}O_4N_2SCl$: C, 54.2; H, 3.45; S, 8.48; Cl, 9.16. Found: C, 54.7; H, 3.61; S, 8.37; Cl, 9.14.

EXAMPLE I

To a 12-liter flask there were charged 257 g. (1.0 mole) of the recrystallized monomer prepared as described in Procedure A, 1-hydroxy-N-($\beta$-vinyloxyethyl)-2-naphthamide, and 98 g. (1.0 mole) of maleic anhydride (reagent grade) and 3000 ml. of benzene (analytical reagent, thiophene free). The charge was brought to reflux, maintained at reflux with stirring for 5 minutes, and cooled. After reflux ceased, 4.0 g. of azo-bis(isobutyronitrile) were added and heat was reapplied to bring the charge to reflux where it was stirred for 45 minutes. Cloudiness caused by the deposition of the copolymer appeared within a few minutes and at the end of the 45-minute period a creamy, yellow slurry was obtained. The slurry was cooled at 60° C., filtered in an 8-inch Buchner funnel, sucked into a soft cake and washed on the funnel with 300 ml. of methylene chloride which had been used to rinse the reaction flask. The wet filter cake was slurried twice with 1500 ml. portions of methylene chloride, was filtered and the cake was washed with 200 ml. portions of methylene chloride after each slurry. The cake was given a final 200 ml. wash with methylene chloride, sucked firm, spread out on a tray and air dried to a constant weight. Lumps were broken up with a spatula during the initial drying period. The yield was 288 g. (82% of theoretical) of a white powder which was the copolymer of maleic anhydride and the color-forming monomer prepared in Procedure A. By ultraviolet absorption analysis the polymer was found to have equivalent weight of 380 which corresponds to a 1:1 copolymer.

EXAMPLE II

To a solution of 14 g. of the color-forming copolymer prepared in Example I, dissolved in 200 ml. of dry acetone, was added 8 g. of n-butylamine. The mixture was refluxed for 3 hours on a steam bath and, after cooling, was poured onto a mixture of 250 g. of ice and 100 ml. of HCl. The precipitate was filtered off after standing for 1 hour, was washed with water to remove the chloride ions and was air dried overnight. The yield was 13 g. of the 1:1 copolymer of 1-hydroxy-N-($\beta$-vinyloxyethyl)-2-naphthamide and N-(n-butyl)maleamic acid with the equivalent weight determined as 473.

In a similar manner, 14.2 g. (0.04 mole) of the color-forming copolymer prepared in Example I, dissolved in 200 ml. of dry acetone, and 3.7 g. (0.05 mole) of diethylamine were refluxed for one and a half hours. After cooling, the mixture was poured onto a mixture of 250 g. of ice and 100 ml. of concentrated HCl. The precipitate which formed was filtered off, was washed with water and was air dried overnight, yielding 11 g. (64% of theoretical) of a 1:1 copolymer of 1-hydroxy-N-($\beta$-vinyloxyethyl)-2-naphthamide and N,N-(diethyl)maleamic acid. Equivalent weight was determined to be 424.

The same maleic anhydride copolymer was reacted with various other amines and alcohols in a similar manner to produce their corresponding half-amides and half-esters. Thus, by reacting 0.04 mole of the maleic anhydride copolymer with 0.04 mole of n-octylamine, the amine converted the anhydride to the corresponding half-amide, giving a yield of 17.5 g. (90.5% of theoretical), with a determined equivalent weight of 495. Similarly, hexylamine was reacted in a similar molar quantity to give a yield of 17 g. (93% of theoretical) of the corresponding half-amide with a determined equivalent weight of 523.

A half-ester was prepared by a similar reaction with n-butanol. The reaction mixture consisted of 14.4 g. of the color-forming copolymer prepared in Example I in 200 ml. of dry acetone, 8 g. of n-butanol and 5 drops of concentrated $H_2SO_4$. A yield of 15 g. (86% of theoretical) of the half-ester was obtained, having an equivalent weight of 405.

In a similar reaction, the maleic anhydride copolymer was partially crosslinked by reaction with the difunctional ethylenediamine. A solution of 13 g. of the maleic anhydride copolymer in acetone was refluxed with 0.5 g. of ethylenediamine, a solid precipitating. The precipitate was filtered, washed and dried, 13 g. of the crosslinked copolymer which was only partly soluble in an alkali-alcohol mixture being obtained. By using a smaller quantity of ethylenediamine in the reaction mixture than indicated above, a more soluble but less crosslinked copolymer was obtained.

The various preparations described in this example illustrate the control which may be exercised over the physical properties of the color-forming copolymer. The maleic anhydride copolymer is very hydrophilic but may be modified to give any desired degree of hydrophobicity by the reactions of the type described above.

EXAMPLE III

A solution of 11.5 g. of the color-forming monomer prepared as described in Procedure B, p-($\alpha$-benzoylacetamido)-N-($\beta$-vinyloxyethyl)benzensulfonamide, in 20 ml. of ethyl propionate and 20 ml. of benzene was refluxed for 5 minutes to expel oxygen. To the solution were added 2.9 g. of maleic anhydride and 0.1 g. of azo-bis (isobutyronitrile). After an additional 30 minutes refluxing, 12 g. of a solid precipitated. The precipitate was removed from the reaction vessel by filtering and was slurried in ether and refiltered. The product was a copolymer of maleic anhydride and the above yellow color former, useful in color photographic emulsions.

EXAMPLE IV

A solution of 11.6 g. of p-($\alpha$-benzoylacetamido)-N-($\beta$-vinyloxyethyl)benzenesulfonamide prepared as described in Procedure B in 30 ml. of diethylmaleate was maintained at 90–95° C. under a stream of nitrogen for 5 minutes to expel oxygen. One-tenth gram of azo-bis(isobutyronitrile) was added and the resulting solution was held another 16 minutes at 90–95° under nitrogen. After cooling to room temperature, the polymer was isolated by pouring the viscous solution into ether in a high-speed mixer. There was obtained 11.8 g. of a white powder, a color-forming copolymer of p-($\alpha$-benzoylacetamido)-N-($\beta$-vinyloxyethyl)-benzene sulfonamide and diethyl maleate.

EXAMPLE V

To a solution of 72 g. of sodium carbonate monohydrate and 48 g. (0.55 mole) of 2-aminoethyl vinyl ether in 845 ml. of water at 10° C. there was added a hot (60° C.) solution of 217 g. of 1-(p-chlorosulfonylphenyl)-3-methyl-5-benzoxypyrazole prepared as described in Procedure C in 1085 ml. of acetonitrile. The resulting mixture was stirred 90 minutes and was poured onto a mixture of 2000 g. of ice and 5000 ml. of water. After the ice had melted, the crude product was collected by filtration and dried. It was purified by recrystallizing from methanol with the aid of decolorizing carbon and dried to give a magenta color-forming vinyl ether monomer. A portion of this monomer was then copolymerized with maleic anhydride, essentially as described in Example I, to produce a magenta color-forming copolymer useful in color photographic emulsions.

EXAMPLE VI

The acid chloride prepared as described in Example I of Martin, U.S. Patent 2,476,986, 1-(p-chloroformylphenyl)-3-methyl-5-pyrazolyl ethyl carbonate, was condensed with 2-aminoethyl vinyl ether essentially as described in Procedure B to form a magenta color-forming vinyl ether monomer. This monomer was subsequently copolymerized with maleic anhydride by the procedure described in Example I to form a magenta color-forming copolymer useful in color photographic emulsions.

EXAMPLE VII

The cyan color-forming copolymer of maleic anhydride and 1-hydroxy-N-(β-vinyloxyethyl)-2-naphthamide of Example I was used in the red-sensitive layer of a multilayer color reversal film element (b) described in Example V of assignee's Evans and Umberger application entitled Photographic Elements, Serial No. 113,285, filed May 29, 1961. The film element was exposed to a color scene and processed by color reversal as described in Example I of the Evans and Umberger application. Visual inspection of the projected color transparencies demonstrated that the cyan color former performed in an excellent manner.

The following compounds are illustrative of the color-forming compounds that can be used in the silver halide emulsion layers of this invention to give results comparable to the color former described in Example VII.

The color formers of this invention can be prepared from a wide range of compounds having naphthol or active methylene containing color-forming nuclei.
Suitable color-forming groups include:

(1) *Cyan*.—Derivatives of 1-hydroxy-2-naphthoic acid disclosed in the examples, alkyl, sulfo, and halogen-substituted derivatives of 1-hydroxy-2-naphthoic acid.

(2) *Magenta*.—3-alkyl and 3-acylamino-1-phenyl pyrazolones where the 1-phenyl group is unsubstituted or substituted by alkyl, halogen, nitro, sulfo, etc.; cyanoacetyl derivatives of substituted and unsubstituted phenyl, naphthyl or heterocyclic compounds.

(3) *Yellow*.—Benzoylacetanilides, unsubstituted or suitably substituted in either aromatic ring; aliphatic acylacetanilides; aliphatic, aromatic and substituted aromatic β-diketones.

Examples of vinyl ether color-couplers for copolymerization with maleic acid derivatives as comprehended by this invention are:

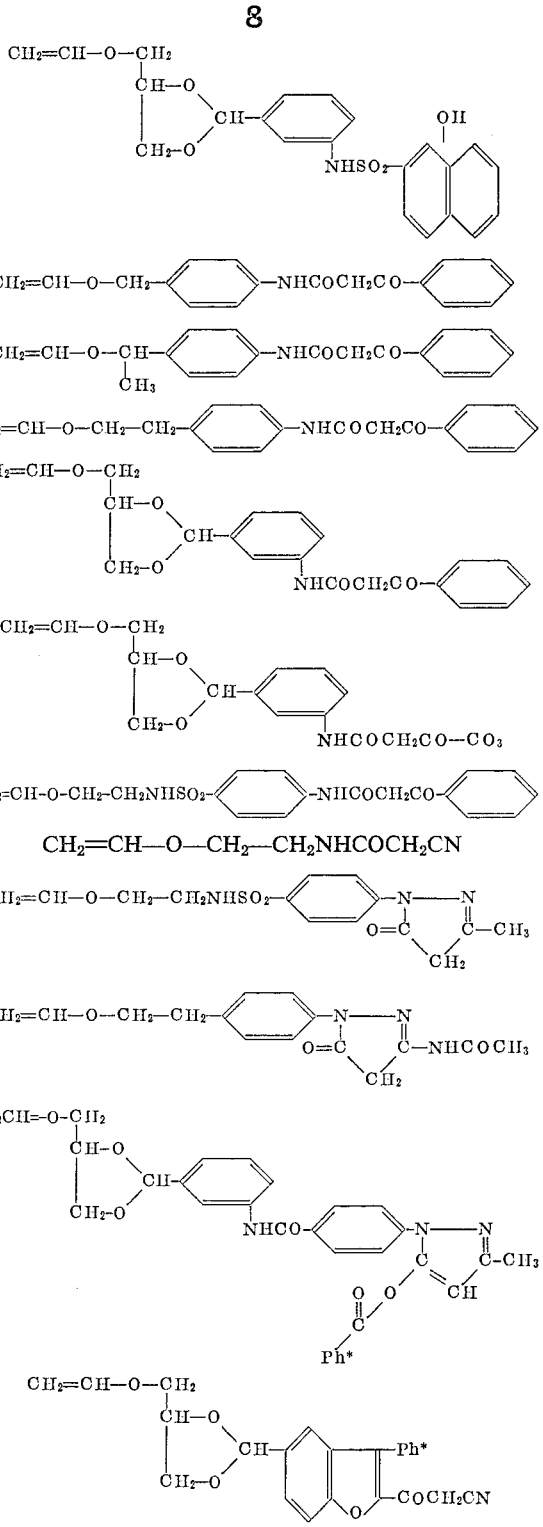

*Where Ph is phenyl.

Any of the above-listed color-forming compounds are useful in forming color-forming copolymers with maleic acid derivative monomers. Although 2-aminoethyl vinyl ether illustrated is a particularly preferred compound for use in preparing the color-forming monomer, other amines may be used, e.g., p-aminophenylvinyl ether, p-aminobenzylvinyl ether and 2-(p-aminophenyl)ethyl vinyl ether, and vinylated p-aminobenzyl methyl carbinol. With the less basic aromatic amines, higher temperatures are required to effect the condensation between the phenyl ester and the vinyl ether-containing amines. Other useful vinyl ethers include the glyceryl vinyl ethers which permit acetal formation with color formers containing an aldehyde function.

The color-forming copolymers prepared from vinyl ether color-forming monomers and maleic acid derivatives are useful in water-permeable colloid-silver halide emulsion layers of color photographic elements. The copolymers due to their low equivalent weight are particularly useful in multilayer color photographic elements having thin emulsion layers. Such photographic elements possess high resolution and image sharpness. The copolymeric color formers are also useful in multilayer photographic elements because they contribute to layer thinness by serving as a binder for the silver halide grains in the light-sensitive emulsion layer. At least a portion of the natural or synthetic water-permeable colloid binder can be replaced by the copolymeric compounds of this invention without altering the properties of the photographic element. In addition to their photographic uses the copolymers are useful as intermediates for the preparation of azo dyes.

The copolymeric color formers have the advantage that a wide variety of color-forming groups can be present to give a large variation in properties, e.g., spectral absorption, stability of the dye which is generated when latent silver halide images are developed in the alkaline color developer solution, etc. Another advantage of the copolymeric compounds is that they are compatible with a large number of water-permeable colloids used in photographic emulsions. A further advantage is that physical properties, e.g., hydrophilicity and hydrophobicity, can be controlled by altering the particular maleic acid derivative utilized. Still another advantage is that the copolymers are essentially non-diffusing and non-migratory in aqueous developing, fixing, bleaching or washing baths. A still further advantage is that the copolymers give a uniquely superior performance in the concentrated emulsions required by modern high speed coating methods. Still other advantages will be apparent to those skilled in the art.

What is claimed is:

1. An addition copolymer consisting of alternating units of the formula

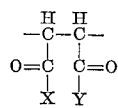

and

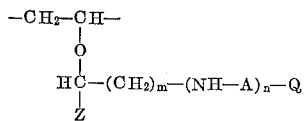

wherein the free bonds are linked together in about a 1:1 ratio and wherein X is a member selected from the group consisting of —OR, —NH$_2$, —NHR, —NR$_2$ and —NRR' where R is alkyl of 1 to 8 carbon atoms and R' is selected from the group consisting of hydrogen and alkyl of 1 to 8 carbon atoms; Y represents the radical —OM where M is selected from the group consisting of alkali metals, ammonium, and substituted ammonium, and X and Y when taken together form a linkage selected from the group consisting of a single divalent oxygen atom link and an imide group link; Z is a member selected from the group consisting of hydrogen and methyl; A is a member selected from the group consisting of

and —SO$_2$—; Q is a color-forming nucleus having as the active color-former a member selected from the group consisting of indazolones, naphthols and active methylene containing compounds and $m$ and $n$ are selected from the group consisting of 0 to 1 with the proviso that $m$ is 1 when $n$ is 1.

2. An addition copolymer as defined in claim 1 where said active methylene containing compound is characterized by the

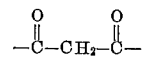

structure.

3. An addition copolymer as defined in claim 1 where said active methylene containing compound is characterized by the

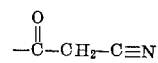

structure.

4. An addition copolymer as defined in claim 1 where said active methylene containing compound is characterized by the

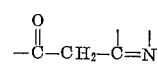

structure.

5. An addition copolymer as defined in claim 1 where said recurring vinyl ether unit is

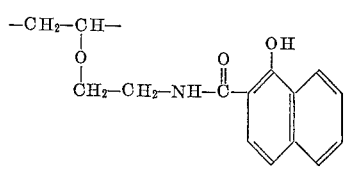

6. An addition copolymer as defined in claim 1 where said recurring vinyl ether unit is

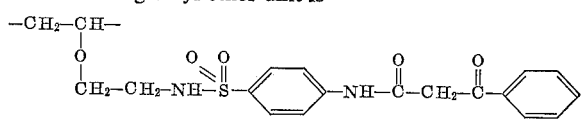

7. An addition copolymer as defined in claim 1 where said recurring vinyl ether unit is

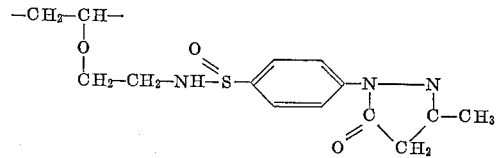

References Cited by the Examiner

UNITED STATES PATENTS

| | | | |
|---|---|---|---|
| 2,397,865 | 4/1946 | Jennings | 260—91.1 |
| 2,895,866 | 7/1959 | Ammon et al. | 260—98.5 |
| 2,920,063 | 1/1960 | Melamed | 260—91.1 |

FOREIGN PATENTS 1,327,392  4/1963  France.

OTHER REFERENCES

India Rubber Journal, April 20, 1946, vol. 110, pp. 501–505.

JOSEPH L. SCHOFER, *Primary Examiner.*

L. WOLF, *Assistant Examiner.*

UNITED STATES PATENT OFFICE
CERTIFICATE OF CORRECTION

Patent No. 3,299,013                          January 17, 1967

Jacob Q. Umberger

It is hereby certified that error appears in the above numbered patent requiring correction and that the said Letters Patent should read as corrected below.

Column 1, lines 68 to 70, after "O" insert -- and -SO$_2$-,
$$-\overset{\overset{O}{\|}}{C}-$$
--; column 2, line 45, for "Weight" read -- Weigh --; column 4, line 8, for "5.95" read -- 5.94 --; line 59, for "benzoxyprazole" read -- benzoxypyrazole --; column 6, line 38, for "benzensulfonamide" read -- benzenesulfonamide --; column 8, lines 45 to 49, the upper left-hand portion of the formula should appear as shown below instead of as in the patent:

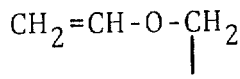

column 10, lines 47 to 54, the formula should appear as shown below instead of as in the patent:

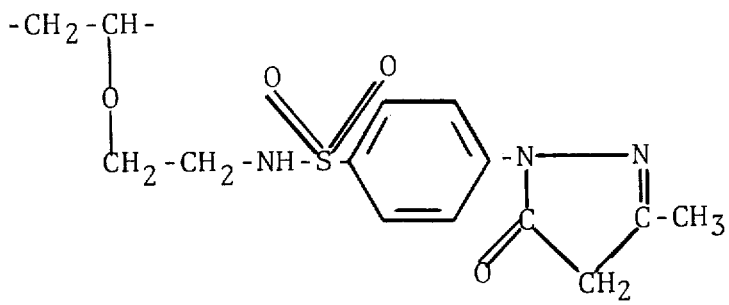

Signed and sealed this 26th day of September 1967.

(SEAL)
Attest:

ERNEST W. SWIDER                          EDWARD J. BRENNER
Attesting Officer                        Commissioner of Patents